United States Patent
Atsumi et al.

(10) Patent No.: US 6,819,522 B2
(45) Date of Patent: Nov. 16, 2004

(54) POSITIONING CONTROL APPARATUS

(75) Inventors: Takenori Atsumi, Ushiku (JP);
Masahito Kobayashi, Ushiku (JP);
Shinsuke Nakagawa, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 10/294,595

(22) Filed: Nov. 15, 2002

(65) Prior Publication Data

US 2003/0095354 A1 May 22, 2003

(30) Foreign Application Priority Data

Nov. 16, 2001 (JP) ........................................ 2001-351925

(51) Int. Cl.$^7$ .............................................. G11B 5/596
(52) U.S. Cl. .................................. 360/78.06; 360/78.08
(58) Field of Search .......................... 360/78.06, 78.08, 360/78.07, 78.09, 75, 78.04, 77.02

(56) References Cited

U.S. PATENT DOCUMENTS

| | | | | | |
|---|---|---|---|---|---|
| 4,775,903 | A | * | 10/1988 | Knowles | 360/78.07 |
| 5,469,414 | A | * | 11/1995 | Okamura | 360/78.06 |
| 5,510,939 | A | * | 4/1996 | Lewis | 360/78.09 |
| 5,710,497 | A | * | 1/1998 | Yanagimachi | 318/632 |
| 6,140,791 | A | * | 10/2000 | Zhang | 318/632 |
| 6,153,997 | A | * | 11/2000 | Kobayashi et al. | 318/560 |
| 6,515,818 | B1 | * | 2/2003 | Harmer | 360/77.08 |
| 6,574,070 | B2 | * | 6/2003 | Gregg | 360/78.09 |
| 6,744,590 | B2 | * | 6/2004 | Chu et al. | 360/78.06 |

FOREIGN PATENT DOCUMENTS

| JP | A-4-508 | 1/1992 |
|---|---|---|
| JP | A-2001-135050 | 5/2001 |

OTHER PUBLICATIONS

"Seeking Control of Hard Disk Drive by Perfect Tracking using Multirate Sampling Control", The Transactions of the Institute of Electrical Engineers of Japan, Section D, vol. 120, No. 10, pp. 1157–1164, Oct. 2000.

S. Nakagawa et al., "Multi–rate Two–Degree of–Freedom Control for Fast and Vibration–less Seeking of Hard Disk Drives", Proceedings of the American Control Conference Arlington, VA June 25–27. 2001.

* cited by examiner

Primary Examiner—David Hudspeth
Assistant Examiner—Fred F. Tzeng
(74) Attorney, Agent, or Firm—Antonelli, Terry, Stout & Kraus, LLP

(57) ABSTRACT

A positioning control apparatus for a magnetic disk apparatus. Internal models and a trajectory generation section are constructed in a control program. Based on generated position trajectory and velocity trajectory and an internal model position and velocity, a model control section outputs a first operation signal Umf for a fixed sample time Tu and then outputs a second operation signal Ums for Tu. The model control section calculates Umf and Ums so as to cause a position Pm and a velocity Vm output by an internal model 2Tu seconds later to coincide with the generated position trajectory and velocity trajectory. When a detector has detected a voice coil saturation current for head movement, a signal obtained by subtracting a position feedback signal Uh from a detected voice coil current is used as an internal model input to thereby cause the model to track a control subject.

16 Claims, 9 Drawing Sheets

POSITIONING CONTROL APPARATUS

BACKGROUND OF THE INVENTION

The present invention relates to a positioning control apparatus, and in particular to a positioning control apparatus suitable for head positioning control of a magnetic disk apparatus.

In a magnetic disk device used as an external storage device of a computer, a magnetic head is moved to a desired track on a rotating magnetic disk face and data recording and reproducing are conducted. In order to increase the processing speed of data access to the magnetic disk device, it is necessary to move a magnetic head to a desired track position at high speed and with high precision. As for conventional techniques of a magnetic head positioning control apparatus, there is, for example, one described in JP-A-4-000508. In this technique, a head position and a head moving speed are detected, and a speed trajectory (profile) for arriving at a desired position and a trajectory of a head drive current are generated on the basis of a deviation between the detected head position and a desired position. Feedback control is effected on a head drive current according to an error between a speed indicated by the speed trajectory and the detected head moving speed and values indicated by the head drive current trajectory. In a technique disclosed in JP-A-2001-135050, a function of conducting feed-forward control on a head by using an acceleration signal corresponding to a head drive current as an input is added to feedback control similar to that described above. As a result, over-muting is prevented from being caused by the feedback control.

A positioning apparatus shown in FIG. 3 is disclosed in Fujimoto et al., "Seeking Control of Hard Disk Drive by Perfect Tracking using Multirate Sampling Control," The transactions of the Institute of Electrical Engineers of Japan, Section D, Vol. 120, No. 10, pp. 1157–1164, October 2000. If a target position Po used until a target position, which is not illustrated, is given in this apparatus, a trajectory generation section 31 first derives a time (seek time) taken until the target position is arrived at. Assuming that a control period of head drive is Tu, which is half of a track position detection period 2Tu, the trajectory generation section 31 derives a position trajectory Pt and a velocity trajectory Vt, which change in position at intervals of 2Tu, for implementing the above stated seek time. An acceleration generation section 32 calculates a feed-forward control signal Um by using the position trajectory Pt and the velocity trajectory Vt according to the following expressions $$U_{mf} = \frac{1}{T_u^2}(P_t - P_{tb}) - \frac{1}{2T_u}(V_t + 3V_{tb}) \quad (1)$$

$$U_{ms} = \frac{1}{T_u^2}(-P_t + P_{tb}) + \frac{1}{2T_u}(3V_t + V_{tb}) \quad (2)$$

where Ptb and Vtb are values of Pt and Vt calculated 2Tu before, and n is an integer that represents the number of periods from the seek operation start time, where one period is Tu. A model 33 is a model representing a control subject, and is given as, for example, a system including a double integral and a time delay. As for this model, a feedback model position signal Pf is calculated from a feed-forward control signal Um derived by the expressions (1) and (2). A difference between the feedback model position signal Pf and an actually detected position signal P of a control subject 35 is input to a position controller 34 as an error signal e. A feedback control signal Uh is generated by the position controller 34. The control subject 35 is controlled by a control signal D, which is the sum of the feed-forward control signal Um and the feedback control signal Uh.

In Shinsuke Nakagawa et al., "Multi-rate Two-Degree-of-Freedom Control for Fast and Vibration-less Seeking of Hard Disk Drives," Proceedings of the American Control Conference Arlington, Va. Jun. 25–27, 2001, there is proposed a calculation method of a target position trajectory with due regard to mechanism resonance characteristics. A further erformance improvement is realized in the calculation method as compared with the above described method proposed by Fujimoto et al.

BRIEF SUMMARY OF THE INVENTION

The technique of Fujimoto et al. and the technique of Nakagawa et al. use a feed-forward control system for causing the head position to track the calculated position trajectory and velocity trajectory, and a feedback control system for compressing the deviation between the head position and the target position trajectory. If there is not a difference between a current command value obtained from the feed-forward control system and the value of an actual current flowing through an actuator, then favorable tracking characteristics can be realized. When the moving distance of the head is long, the control signal attempts to flow a large drive current and consequently current saturation is apt to occur in the actuator, which drives the head. If a large difference occurs between the current command value obtained from the feed-forward control system and the value of the actual current flowing through the actuator, then the deviation between the head position P and the model position signal Pf for position feedback increases, and aggravation of the tracking performance caused by an anti-windup phenomenon cannot be avoided. Furthermore, it also poses a problem that the deviation between the model position signal Pf for position feedback and the head position P is increased by computation errors and numerical value rounding errors generated when calculating the feed-forward input.

An object of the present invention is to provide a positioning control apparatus that improves the technique of Shinsuke Nakagawa et al. and that prevents the control performance from being aggravated even when current saturation has occurred in the actuator or even when computation errors pose a problem.

In accordance with a first aspect of the present invention, there is provided a positioning control apparatus for moving a head that conducts recording and/or reproducing on a magnetic recording medium to a target position, the positioning control apparatus including: a trajectory generation unit for calculating a seek time required to move the head to a given target position, and a position trajectory and a velocity trajectory within the seek time every 2Ts, Ts being a sampling period of a position signal detected by a head position detection unit; a rigid body model and a dead time model of a head system ranging from outputting of a head drive signal to outputting of a detected position signal, inclusive of a head drive unit; a model control unit for calculating first and second model feedback control signals every 2Ts so as to cause a rigid body model position and a rigid body model velocity calculated by using the rigid body model to coincide respectively with the position trajectory and the velocity trajectory at a next sampling time point of the position signal, Ts being the sampling period of the position signal; a position control unit for calculating a feedback control signal based on a deviation between a model position for position feedback calculated by using the rigid body model and the dead time model and the detected position signal; a saturation detection unit for effecting detection to determine whether a drive current flowing through the head drive means is saturated; and a switching unit for setting an input control signal equal to the first model feedback control signal at an even-numbered sampling time point of the position signal, setting the input control signal equal to the second model feedback control signal at an odd-numbered sampling time point of the position signal, responding to the drive current being judged by the saturation detection unit to be not saturated by setting a model input of the rigid body model equal to the input control signal and outputting a sum of the feedback control signal calculated by the position control unit and the input control signal to the head system as the head drive signal, and responding to the drive current being judged to be saturated by setting the model input of the rigid body model equal to a signal obtained by subtracting the feedback control signal calculated by the position control unit from a head acceleration corresponding to the drive current and outputting the input control signal or the head acceleration to the head system as the head drive signal.

In accordance with a second aspect of the present invention, there is provided a positioning control apparatus for moving a head that conducts recording and/or reproducing on a magnetic recording medium to a target position, the positioning control apparatus including: a trajectory generation unit for calculating a seek time required to move the head to a given target position, and a position trajectory and a velocity trajectory within the seek time every Ts, Ts being a sampling period of a position signal detected by a head position detection unit; a rigid body model and a dead time model of a head system ranging from outputting of a head drive signal to outputting of a detected position signal, inclusive of a head drive unit; a model control unit for calculating first and second model feedback control signals every Ts so as to cause a rigid body model position and a rigid body model velocity calculated by using the rigid body model to coincide respectively with the position trajectory and the velocity trajectory at a next sampling time point of the position signal; a position control unit for calculating a feedback control signal based on a deviation between a model position for position feedback calculated by using the rigid body model and the dead time model and the detected position signal; a saturation detection unit for effecting detection to determine whether a drive current flowing through the head drive unit is saturated; and a switching unit for setting an input control signal equal to the first model feedback control signal during a former half having (½)Ts of the sampling period Ts beginning with a sampling time point of the head signal, setting the input control signal equal to the second model feedback control signal during a latter half having (½)Ts of the sampling period Ts, responding to the drive current being judged by the saturation detection unit to be not saturated by setting a model input of the rigid body model equal to the input control signal and outputting a sum of the feedback control signal calculated by the position control unit and the input control signal to the head system as the head drive signal, and responding to the drive current being judged to be saturated by setting the model input of the rigid body model equal to a signal obtained by subtracting the feedback control signal calculated by the position control unit from a head acceleration corresponding to the drive current and outputting the input control signal or the head acceleration to the head system as the head drive signal.

In accordance with a third aspect of the present invention, there is provided a positioning control apparatus for moving a head that conducts recording and/or reproducing on a magnetic recording medium to a target position, the positioning control apparatus including: a trajectory generation unit for calculating a seek time required to move the head to a given target position, and a position trajectory and a velocity trajectory within the seek time every 2Ts, Ts being a sampling period of a position signal detected by a head position detection unit; a rigid body model and a dead time model of a head system ranging from outputting of a head drive signal to outputting of a detected position signal, inclusive of a head drive unit; a model control unit for calculating first and second model feedback control signals every 2Ts so as to cause a rigid body model position and a rigid body model velocity calculated by using the rigid body model to coincide respectively with the position trajectory and the velocity trajectory at a next sampling time point of the position signal, Ts being the sampling period of the position signal; a position control unit for calculating a feedback control signal based on a deviation between a model position for position feedback calculated by using the rigid body model and the dead time model and the detected position signal; a saturation detection unit for effecting detection to determine whether a drive current flowing through the head drive unit is saturated; and a switching unit for setting an input control signal equal to the first model feedback control signal at an even-numbered sampling time point of the position signal, setting the input control signal equal to the second model feedback control signal at an odd-numbered sampling time point of the position signal, responding to an absolute value of a difference between the first and second model feedback control signals exceeding a predetermined threshold by setting a vibration compensation input equal to an average of the two model feedback control signals, responding to the absolute value not exceeding the predetermined threshold by setting the vibration compensation input equal to the input control signal, responding to the drive current being judged by the saturation detection unit to be not saturated by setting a model input of the rigid body model equal to the input control signal and outputting a sum of the feedback control signal calculated by the position control unit and the vibration compensation input to the head system as the head drive signal, and responding to the drive current being judged to be saturated by setting the model input of the rigid body model equal to a signal obtained by subtracting the feedback control signal calculated by the position control unit from a head acceleration corresponding to the drive current and outputting the vibration compensation input or the head acceleration to the head system as the head drive signal.

In accordance with a fourth aspect of the present invention, there is provided a positioning control apparatus for moving a head that conducts recording and/or reproducing on a magnetic recording medium to a target position, the positioning control apparatus including: a trajectory generation unit for calculating a seek time required to move the head to a given target position, and a position trajectory and a velocity trajectory within the seek time every Ts, Ts being a sampling period of a position signal detected by a head position detection unit; a rigid body model and a dead time model of a head system ranging from outputting of a head drive signal to outputting of a detected position signal, inclusive of a head drive unit; a model control unit for calculating first and second model feedback control signals every Ts so as to cause a rigid body model position and a rigid body model velocity calculated by using the rigid body model to coincide respectively with the position trajectory and the velocity trajectory at a next sampling time point of the position signal; a position control unit for calculating a feedback control signal based on a deviation between a model position for position feedback calculated by using the rigid body model and the dead time model and the detected position signal; a saturation detection unit for effecting detection to determine whether a drive current flowing through the head drive unit is saturated; and a switching unit for setting an input control signal equal to the first model feedback control signal during a former half having (½)Ts of the sampling period Ts beginning with a sampling time point of the head signal, setting the input control signal equal to the second model feedback control signal during a latter half having (½)Ts of the sampling period Ts, responding to an absolute value of a difference between the first and second model feedback control signals exceeding a predetermined threshold by setting a vibration compensation input equal to an average of the two model feedback control signals, responding to the absolute value not exceeding the predetermined threshold by setting the vibration compensation input equal to the input control signal, responding to the drive current being judged by the saturation detection unit to be not saturated by setting a model input of the rigid body model equal to the input control signal and outputting a sum of the feedback control signal calculated by the position control unit and the vibration compensation input to the head system as the head drive signal, and responding to the drive current being judged to be saturated by setting the model input of the rigid body model equal to a signal obtained by subtracting the feedback control signal calculated by the position control unit from a head acceleration corresponding to the drive current and outputting the vibration compensation input or the head acceleration to the head system as the head drive signal.

In accordance with a fifth aspect of the present invention, there is provided a positioning control apparatus, in which: a resonance model of the head system is added to the positioning control apparatus; the model position for position feedback is calculated by using the resonance model, the rigid body model, and the dead time model; when the saturation detection unit has judged the drive current to be not saturated, the switching unit sets a model input of the resonance model equal to the input control signal; and when the saturation detection means has judged the drive current to be saturated, the switching unit sets the model input of the resonance model equal to a signal obtained by subtracting the feedback control signal calculated by the position control unit from the head acceleration corresponding to the drive current.

In accordance with a sixth aspect of the present invention, there is provided a positioning control apparatus, in which: a resonance model of the head system is added to the positioning control apparatus; the model position for position feedback is calculated by using the resonance model, the rigid body model, and the dead time model; when the saturation detection unit has judged the drive current to be not saturated, the switching unit sets a model input of the resonance model equal to the vibration compensation input; and when the saturation detection unit has judged the drive current to be saturated, the switching unit sets the model input of the resonance model equal to a signal obtained by subtracting the feedback control signal calculated by the position control unit from the head acceleration corresponding to the drive current.

Other objects, features and advantages of the invention will become apparent from the following description of the embodiments of the invention taken in conjunction with the accompanying drawings.

DETAILED DESCRIPTION OF THE INVENTION

Figure 2:
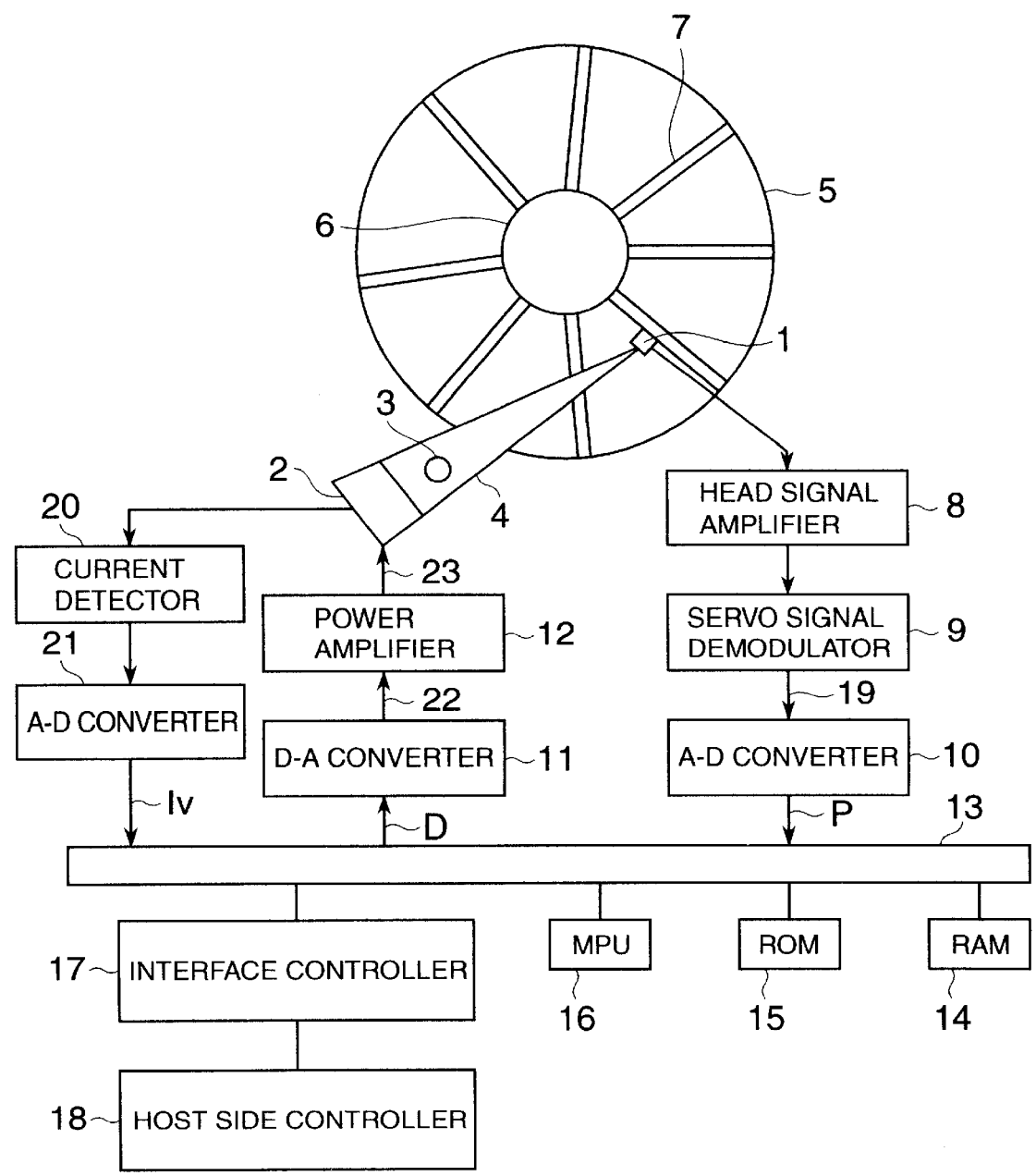
FIG. 2 is a diagram showing a configuration example of a positioning control apparatus and a magnetic disk head section according to the present invention.
Figure 3:
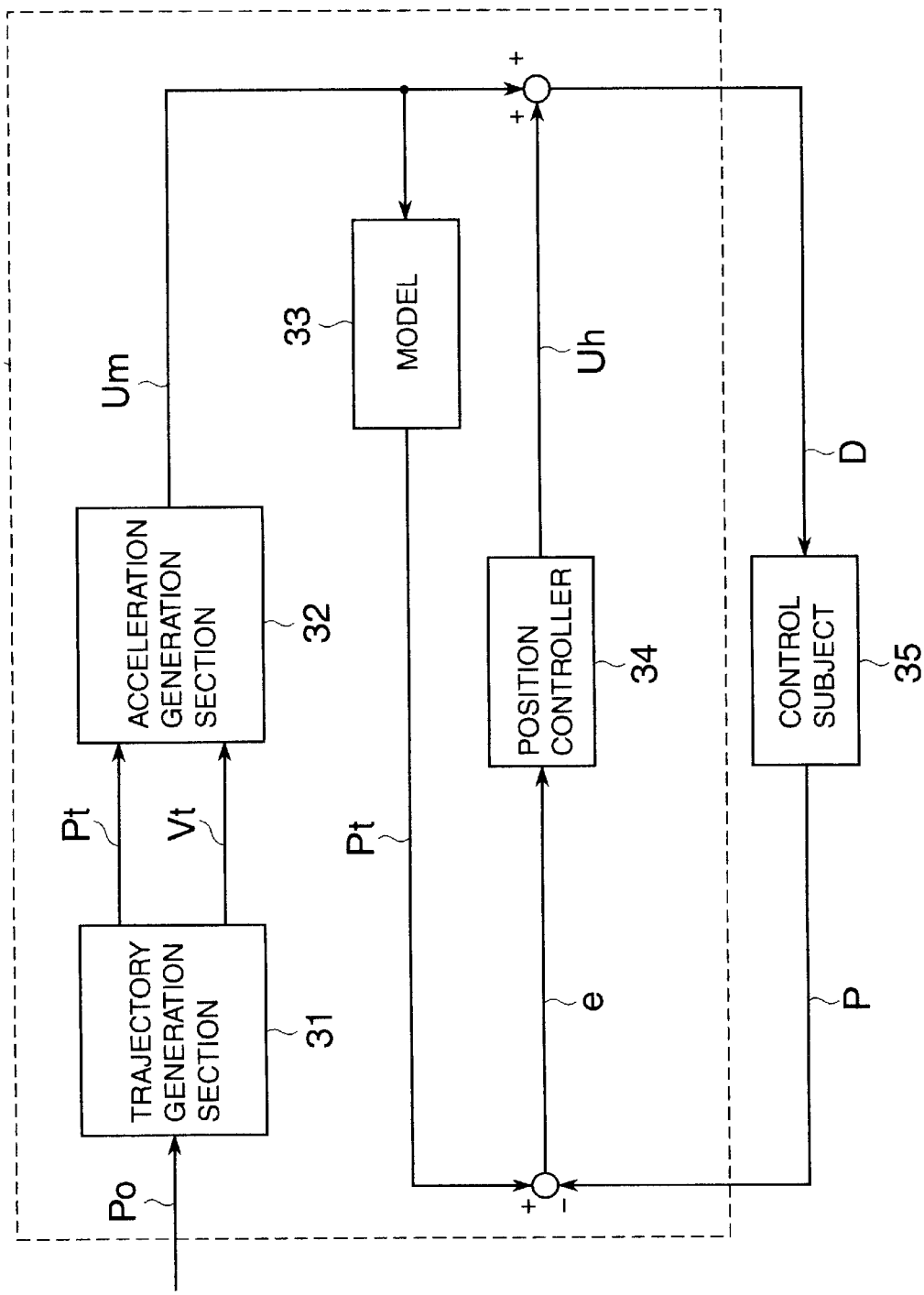
FIG. 3 is a block diagram showing a configuration of a conventional positioning control apparatus.

Hereafter, embodiments of the present invention will be described in detail. FIG. 2 shows a configuration of a positioning control apparatus according to the present invention and a head disk of a magnetic disk apparatus to be controlled. A magnetic disk 5 serving as a recording medium is fixed to a spindle motor 6. The spindle motor is rotated with a predetermined number of rotations. In a side direction of the magnetic disk 5 held by the spindle motor 6, a pivot bearing 3 is disposed so as to be parallel to an axis of the spindle motor. A carriage 4 is fixed to the pivot bearing 3 so as to be able to oscillate. A magnetic head 1 is fixed to a tip of the carriage 4. Motive power for moving the magnetic head 1 is generated by a voice coil motor (VCM) 2. A servo sector 7 on the magnetic disk has a track position signal recorded thereon. A signal read by the magnetic head 1 is amplified by a head signal amplifier 6, and demodulated by a servo signal demodulator 9. A demodulated servo signal 19 is converted to a digital signal by an A–D converter 10. The digital signal is taken into an MPU 16 via a bus 13. Since the number of rotations of the magnetic disk 5 is constant, the position signal recorded on the servo sector 7 is read with a period of a fixed time, and input to the MPU 16 as a digitized position signal P. A current actually flowing through the VCM 2 is detected by a current detector 20, digitized by an A–D converter 21, and input to the MPU 16 as a digital VCM current signal IV.

With regard to the MPU 16, a ROM 15 and a RAM 14 are provided via a bus 13. Various control programs including a program to be executed in the MPU 16 in order to implement the function of the present invention are stored in the ROM 15. Parameters required for various kinds of control are also stored in the ROM 15. An interface controller 17 is connected to the MPU 16 via the bus 13. The interface controller 17 receives a command of a host side controller 18, and issues a read/write access request to the MPU 16. If a command requesting a data read/write operation (a seek command) is issued, then the MPU 15 executes a program stored in the ROM 15, generates an optimum VCM control signal D according to a distance between the current head position and the target position, and applies the VCM control signal D to the VCM 2 via a D–A converter 11 and a power amplifier 12. The VCM 2 generates driving force of a head actuator, and positions the head in the target position.

Figure 1:
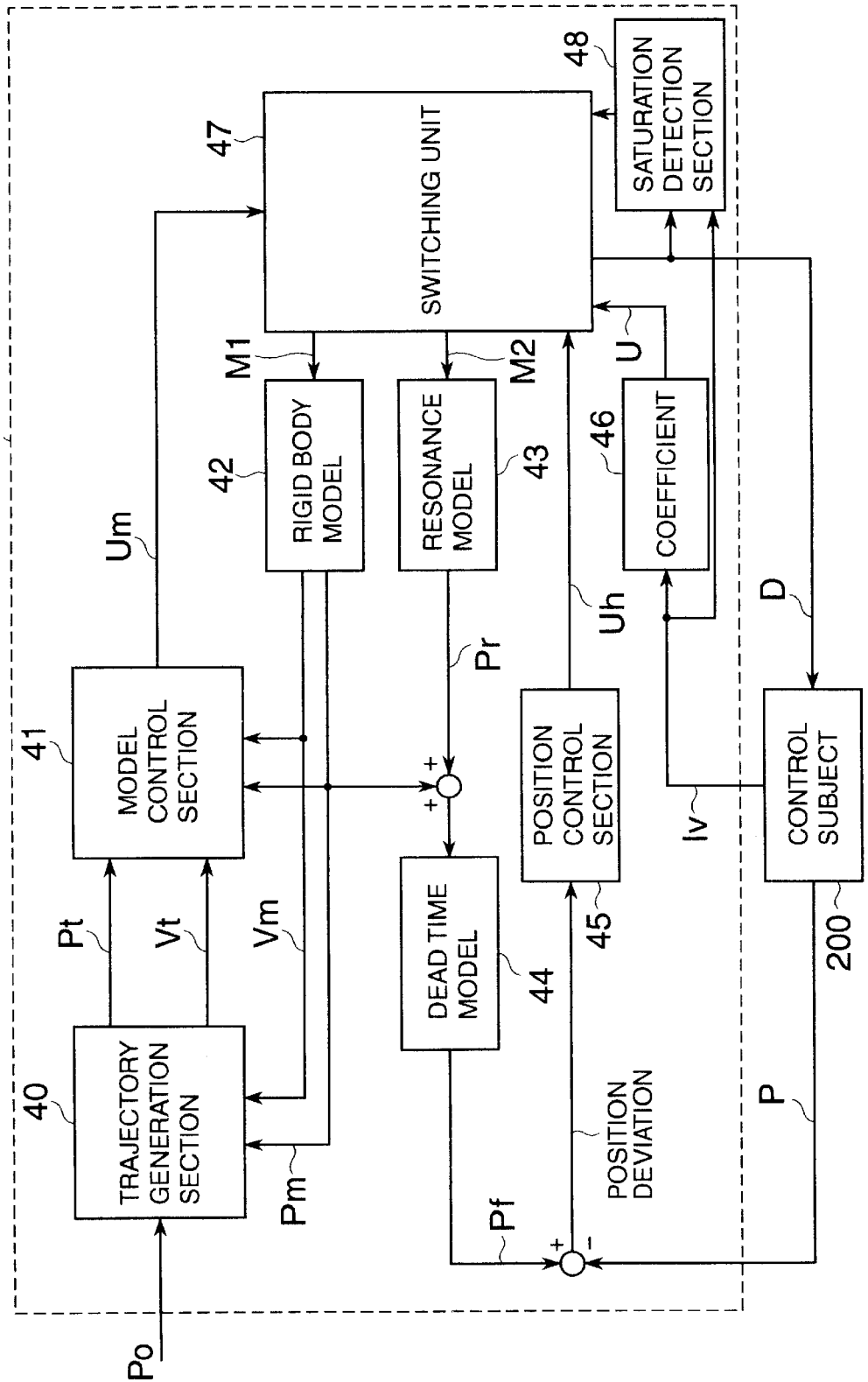
FIG. 1 is a block diagram showing a configuration example of a positioning control apparatus according to the present invention.

FIG. 1 is a block diagram showing a configuration example of a positioning control apparatus according to the present invention, and it is implemented by processing conducted in the MPU 16 described with reference to FIG. 2. In FIG. 1, a control subject 200 means a transfer characteristic that is supplied with the VCM control signal D calculated by the MPU 16 of FIG. 2 as its input and that outputs a digitized track signal of the head as the position signal. On the other hand, a control section 100 is supplied with a target position Po of a track where data is read and written, the position signal P indicating a current head position, and the detected value IV of the current flowing through the VCM 2. The control section 100 calculates the VCM control signal D for positioning the head on the basis of the input values, and applies the VCM control signal D to the VCM 2. Hereafter, operations of respective blocks of the control section 100 will be described.

Denoting a detection period of the position signal P and a switching period of a feedback control signal Uh by Ts, it is now supposed that a control period Tu of head drive is equal to Ts. A trajectory generation section 40 calculates a target position Po corresponding to a target track from/to which data is read/written, and a seek time Tf required until the target position is arrived at. The trajectory generation section 40 generates a position trajectory Pt and a velocity trajectory Vt every 2Tu seconds. At that time, initial values of the position trajectory Pt and the velocity trajectory Vt are set equal to values of them obtained at the time of start of seek operation. The position trajectory Pt and the velocity trajectory Vt at time t=0, 2Tu, . . . are calculated by using the initial values and accelerations at the time of seek operation start. In some cases, such as when the VCM current has recovered from a saturation state to a non-saturation state, or when it is desired to increase the computation precision as the seek end is approached, the control performance is improved by rebuilding the position trajectory and the velocity trajectory. In such a case, the trajectory generation section 40 rewrites the initial position so as to become a rigid body model position Pm, rewrites the initial velocity so as to become a rigid body model velocity Vm, and rewrites the initial acceleration so as to become a signal M1 by using input and output signals of a model described later at time Tc when switching is conducted. The position trajectory Pt and the velocity trajectory Vt are thus rebuilt. When calculating the rebuilt position trajectory and the velocity trajectory, the seek time is set equal to Tf−Tc and the current time is set equal to t−Tc.

The control section 100 has a rigid body model 42, a resonance model 43, and a dead time model 44 as its internal models. They may be the same as those of the conventional technique. In the case where the influence of the resonance characteristics the control subject has is slight or the case where modeling is difficult, it is not always necessary to consider the resonance model 43. The rigid body model 42 calculates the rigid body model position Pm and the rigid body model velocity Vm by using the following expressions (3) and (4), $$P_m = P_{mb} + T_u V_{mb} + \frac{1}{2} T_u^2 U_{mfb} \quad (3)$$

$$V_m = V_{mb} + T_u U_{mb} \quad (4)$$

where Pmb and Vmb are values of the rigid body model outputs Pm and Vm at a previous sample time point. Umfb is a value of a model feedback control signal Um calculated by a model control section 41 every 2Tu as described later. When representing the resonance model 43 by using a pulse transfer function from an input signal to a resonance model position, it is obtained by making the following expression (5), which represents a vibration mode in a continuous time system, discretize by zeroth holding at a sampling period Tu.

$$\frac{a}{s^2 + 2\zeta\omega_n s + \omega_n^2} \quad (5)$$

When representing the dead time model 44 by using a pulse transfer function with Td denoting a dead time of the control system, it is obtained by approximating a transfer function of a dead time element $$e^{-T_d s} \quad (6)$$

with a rational function and then implementing a result in a discrete time system. In the present embodiment, Pade linear approximation is used as method for approximation to a rational function.

A position control section 45 includes a following compensator for implementing a desirable control performance, which is known in the art of the magnetic disk apparatus. The position control section 45 calculates a feedback control signal Uh for compressing a deviation between a model position Pf for position feedback and the position signal P. Here, both the sampling period of the position information P and the period of the feedback control signal Uh are Ts seconds, which is equal to the period of the model feedback control signal Um.

The model control section 41 refers to the position trajectory Pt, the velocity trajectory Vt, the rigid body model position Pm, and the rigid body model velocity Vm every 2Tu seconds, and calculates the model feedback control input Um by using expressions (7) and (8) so as to make the rigid body model position Pm coincide with the position trajectory Pt and make the rigid body model velocity Vm coincide with the velocity trajectory Vt, 2Tu seconds later. In an interval of n (=0, 1, 2, . . . ) Tu after the seek control start, U is represented by Umf when n is even and U is represented by Ums when n is odd.

$$U_{mf} = \frac{1}{T_u^2}(P_t - P_m) - \frac{1}{2T_u}(V_t + 3V_m) \quad (7)$$

$$U_{ms} = \frac{1}{T_u^2}(-P_t + P_m) + \frac{1}{2T_u}(3V_t + V_m) \quad (8)$$

A coefficient 46 is a constant for converting the detected VCM current value signal IV to an acceleration signal U, which represents an acceleration of the control subject 200.

A switching unit 47 is supplied with the model feedback control signal Um, the feedback control signal Uh, and the acceleration signal U. According to a saturation detection section 48 for detecting the saturation/non-saturation of the VCM current, the switching unit 47 switches values of its outputs, i.e., model inputs M1 and M2 and the VCM control signal D. The decision as to whether the VCM current is in the saturation state or in the non-saturation state conducted in the saturation detection section 48 is effected by comparing the VCM control signal D with the VCM current signal IV. If the difference between them is at least a predetermined value, then the VCM current is judged to be in the saturation current.

Figure 4:
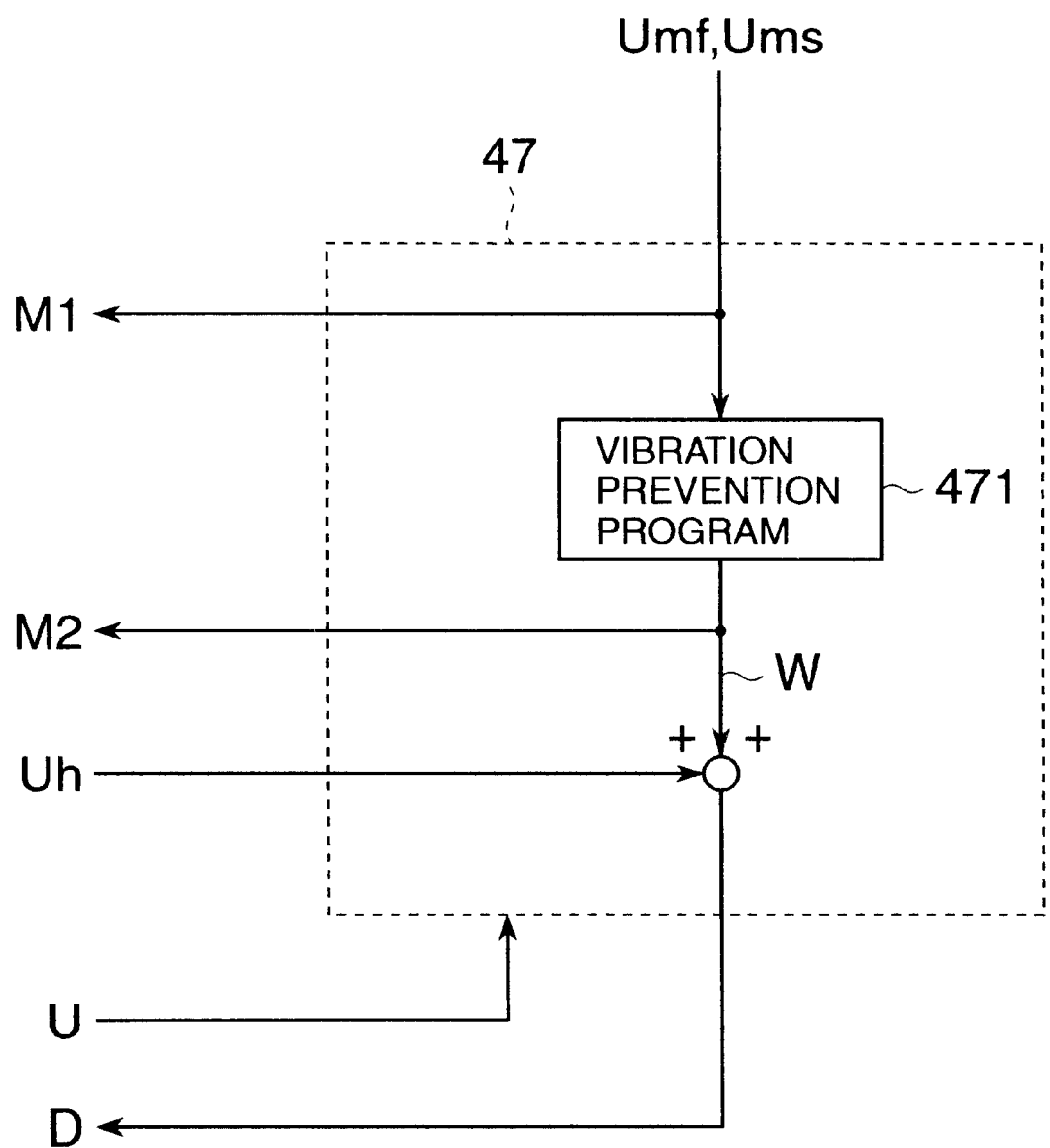
FIG. 4 is a diagram showing an operation of a switching unit conducted when a VCM current is not saturated.

FIG. 4 is a block diagram showing an operation example of the switching unit 47 at the time when the VCM current is not saturated. If an absolute value of a difference between two values calculated by the model control section 41, i.e., an absolute value of Umf−Ums is greater than a certain prescribed value, then a vibration prevention program 471 outputs an average value of Umf and Ums as a signal W. At this time, the value of W changes every 2Tu. If the absolute value of Umf−Ums is less than the certain prescribed value, then the vibration prevention program 471 outputs the model feedback control signal Um intactly as the signal W. This value changes every Tu. Owing to the insertion of the vibration prevention program, it is possible to prevent the control subject 200 and the resonance model 43 from being vibrated by the model feedback control signal Um when the model feedback control signal Um has become vibratory. And the model input M1 is set equal to the model feedback control signal Um, and the model input M2 is set equal to the signal W obtained after passing through the vibration prevention program. The VCM control signal D is derived as the sum of the signal W and the feedback control signal Uh.

Figure 5:
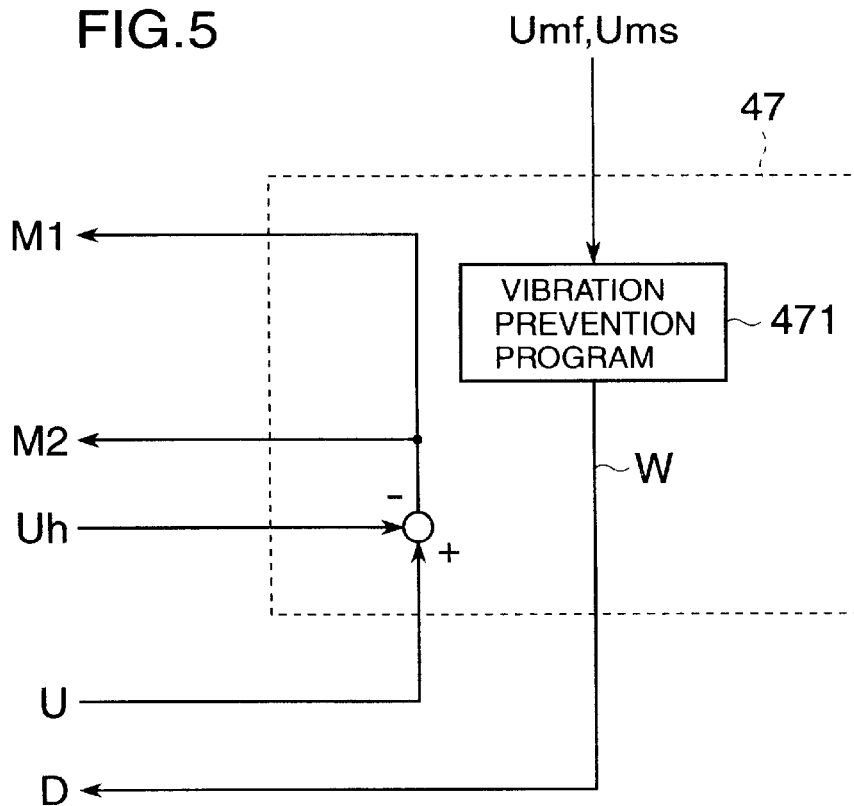
FIG. 5 is a diagram showing an operation of a switching unit conducted when a VCM current is saturated.

FIG. 5 is a block diagram showing an operation example of a switching unit 47 conducted when the VCM current is saturated. A vibration prevention program 471 is the same as that shown in FIG. 4. The VCM control signal D is set equal to the output signal W of the vibration prevention program 471. The model input M1 and the model input M2 are calculated as a signal obtained by subtracting the feedback control signal Uh from the acceleration signal U.

Figure 6:
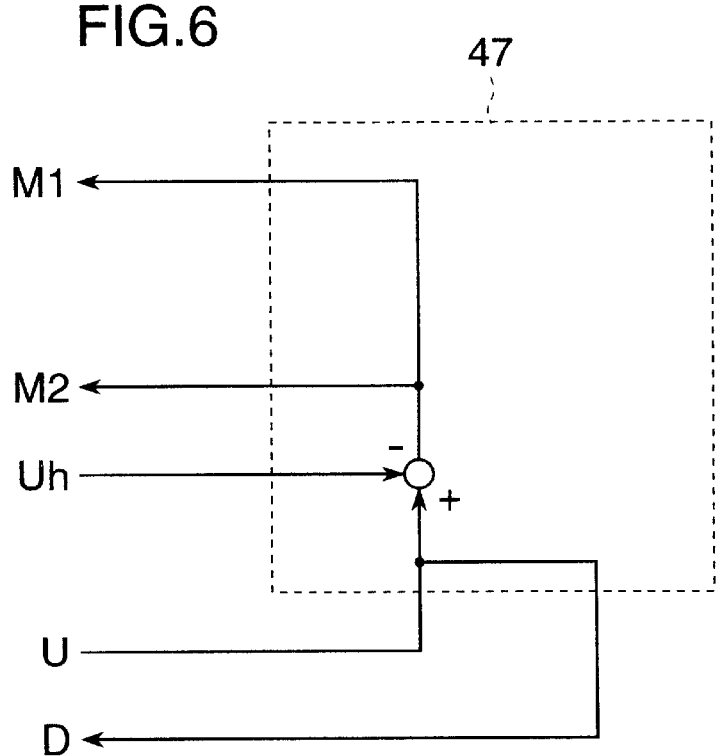
FIG. 6 is a diagram showing a different operation of a switching unit conducted when a VCM current is saturated.

FIG. 6 is a block diagram showing another operation example of the switching unit 47 conducted when the VCM current is saturated. In this block diagram, the model inputs M1 and M2 are the same as those of FIG. 5. However, this block diagram differs from FIG. 5 in that the acceleration signal U is used as the VCM control signal D.

Heretofore, operations of respective blocks shown in FIG. 1 have been described. An operation of positioning control obtained by putting the operations of the respective blocks together will now be described with reference to a flow chart shown in FIG. 7. First, if the host side controller 18 (FIG. 2) issues the seek command, the trajectory generation section 40 calculates the target position Po corresponding to the target track from/to which data is read/written, and the time (seek) time Tf required until seek completion (step S1). It is now supposed that the number of times of sampling of head position information ranging from the seek start time to the current time (exclusive of the sampling of the head position information at the time of seek start) is n=1, 2, .... At the time of seek start, n=0. If n is even, the trajectory generation section 40 calculates the position trajectory Pt and the velocity trajectory Vt. By using the values Pt and Vt, and the rigid body model position Pm and the rigid body model velocity Vm already calculated at a previous sampling time point, the model control section 41 calculates the model feedback control signal Um according to the expressions (7) and (8) (steps S2 to S4).

Subsequently, processing of the vibration prevention program 471 is conducted. First, it is determined whether the absolute value of the difference between two values Umf and Ums calculated according to the equations (7) and (8) is greater than a predetermined value δ (step S5). If the absolute value is greater than δ, then the output signal W of the vibration prevention program 471 is set equal to (Ums+Umf)/2 (step S6). If the absolute value is less than δ, then the operation W=Umf is conducted when the number of times of sampling is even whereas the operation W=Ums is conducted when the number of times of sampling is odd (steps S7 to S9).

Subsequently, the position deviation obtained by subtracting the detected position signal P from the model position Pf for position feedback is input to the position control unit 45, and the feedback control signal Uh is calculated (step S10). Subsequently, the saturation detection section 48 determines whether the VCM current is saturated (step S11). If the VCM current is not saturated, then the operation represented as "the model input M1=Um, the model input M2=W, and the VCM control signal D=W+Uh" is conducted (step S12). If the VCM current is saturated, then the operation represented as "the model input M1=M2=U−Uh, and the VCM control signal D=W (in the case of FIG. 5) or D=U (in the case of FIG. 6)" is conducted (step S13). If the model inputs M1 and M2 are derived, then the rigid body model position Pm, the rigid body model velocity Vm and a resonance model position Pr are calculated (step S14). Thereafter, the sum of the rigid body model position Pm and the resonance model position Pr is input to the dead time model 44, and the model position Pf for position feedback is calculated (step S15). If nTu, which is the time between the seek start and the present time, is less than the seek time Tf (No at step S16), then the position signal P is sampled (step S17) and computation processing heretofore described is repeated.

As heretofore described in detail, in the present invention, a trajectory tracking model having a rigid body mode implemented in a discrete time system, and a head position tracking model having a model including the rigid body mode, mechanism resonance, and equivalent dead time implemented in a discrete time system are implemented in the control program as internal models. And the feedback (trajectory tracking feedback) control signal Um is calculated so as to make the position Pm of the trajectory tracking model and the velocity Vm of the trajectory tracking model coincide with the target position trajectory Pt and the target velocity trajectory Vt, respectively, at a sampling point. When the actuator current is not saturated, the trajectory tracking feedback control signal Um is input to the internal model and the actuator. On the other hand, when the current is saturated, the trajectory tracking model is supplied not the trajectory tracking feedback control signal Um, but the acceleration command value U based on the detected VCM current.

Subsequently, the feedback (model tracking feedback) control signal Uh for compressing the deviation between the head position tracking model position and the head position is calculated. When the actuator current is not saturated, the model tracking feedback control signal Uh is input to the actuator side. When the actuator current is saturated, the model tracking feedback control signal inverted in sign −Uh is input to the internal model side. This results in a mechanism in which the head position tracks the model position for head tracking when the current is not saturated, whereas the model position for head tracking tracks the head position when the current is saturated. In addition, by inputting the acceleration command value based upon the VCM current value to the internal model when the current is saturated, the deviation between the head position and the model position can be suppressed when the current is saturated.

Figure 8A:
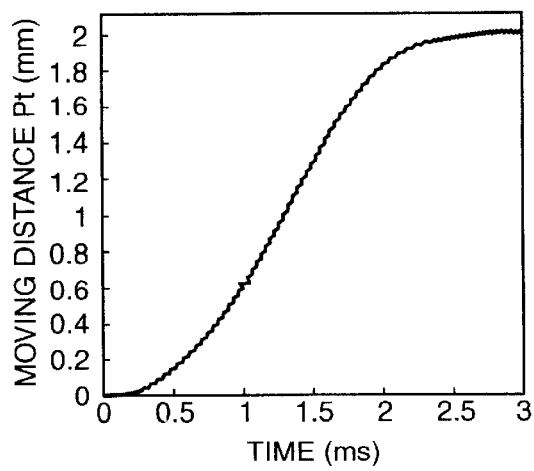
FIGS. 8A to 8D are diagrams showing operation examples of the positioning control apparatus shown in FIG. 1.
Figure 8B:
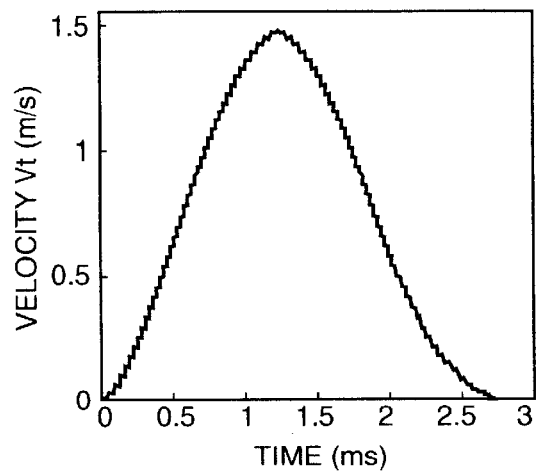
Figure 8C:
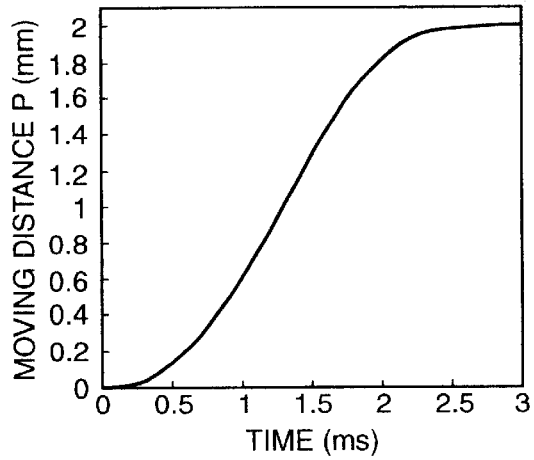
Figure 8D:
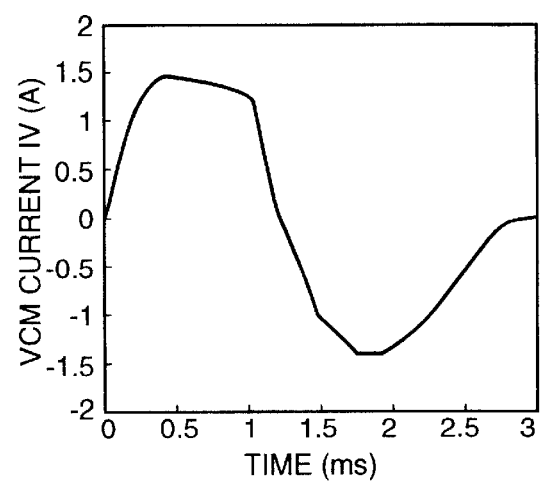

FIGS. 8A to 8D show operation examples of the positioning control apparatus shown in FIG. 1 under the condition that the target position Po=2 mm, seek time Tf=3 ms, control period Tu=Ts=40 $\mu$s, and delay time of the model Td=10 $\mu$s. Parameters of the resonance model of the expression (5) are a=1.0, $\zeta$=0.5, and $\omega$n=2$\pi$×4000. FIG. 8A shows a time response of the position trajectory Pt, and FIG. 8B shows a time response of the velocity trajectory Vt. When such a trajectory is given, a time response of the position signal P shown in FIG. 8C is obtained as a result. A time response of a current waveform at that time is shown in FIG. 8D. It will be appreciated from these results that in the positioning control system according to the present invention the position signal P representing the actual head position tracks the position trajectory Pt with high precision. Furthermore, it can be confirmed from the time response of the VCM current IV that the VCM current is saturated in the present embodiment. It will be appreciated that the head position tracks the target trajectory with high precision in the positioning control system according to the present invention even if the current saturation occurs.

Figure 9:
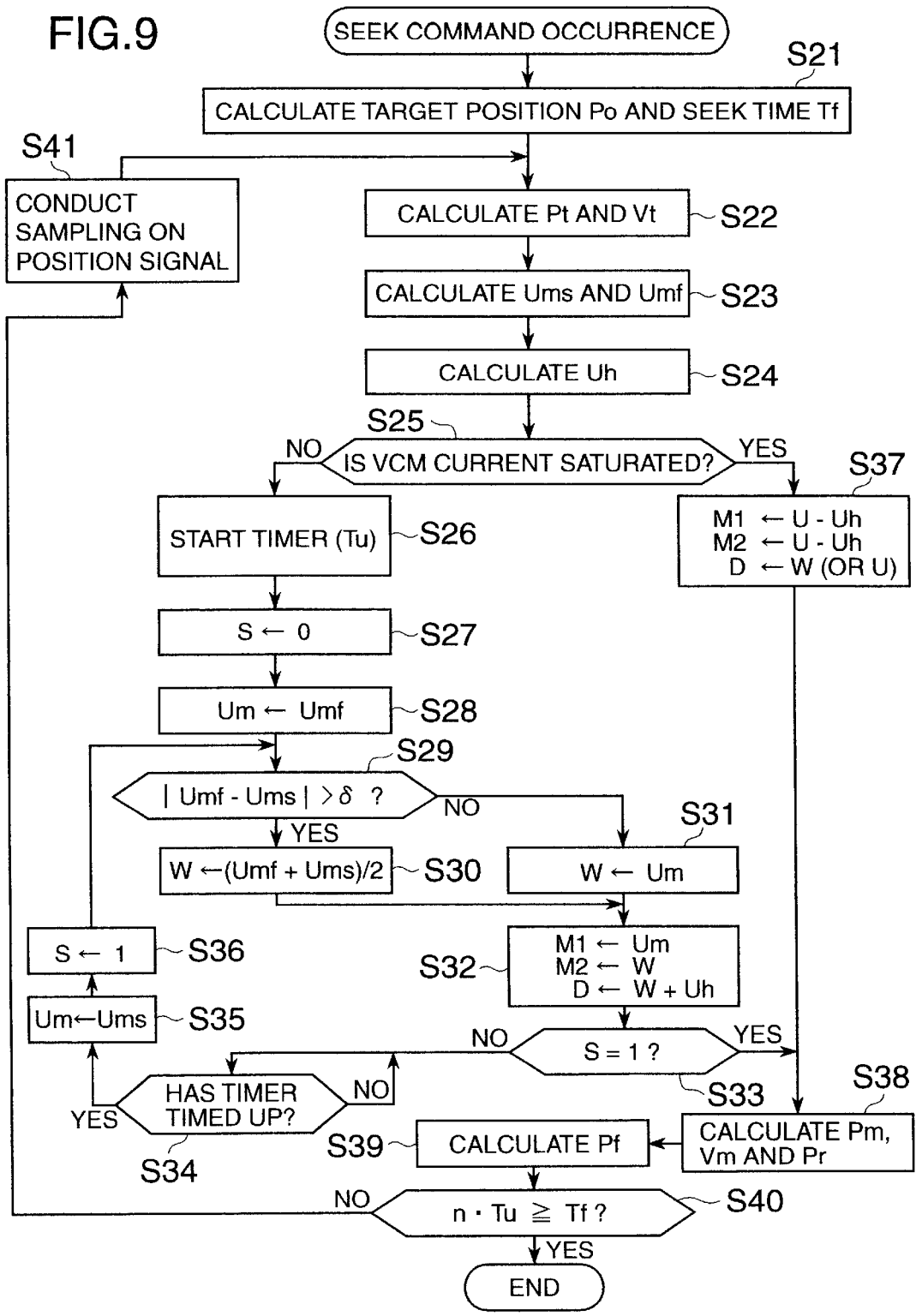
FIG. 9 is a different flow chart example showing an operation of the whole positioning control apparatus shown in FIG. 1.

FIG. 9 is a flow chart showing an operation of another configuration example of a positioning control apparatus according to the present invention. Its block diagram is the same as FIG. 1. However, there is a difference in operation of partial blocks. In the flow chart of FIG. 7, it has been supposed that the sampling period of the position information P and the period Ts of the feedback control signal Uh is equal to the switching period Tu of the model feedback control signal Um. In the case of FIG. 9, however, as against Ts of the sampling period and the period of the feedback control signal Uh, the period Tu of the model feedback control signal is made equal to Ts/2. In other words, the model feedback control signal Um is twice in rate the sampling of the position signal P.

Figure 7:
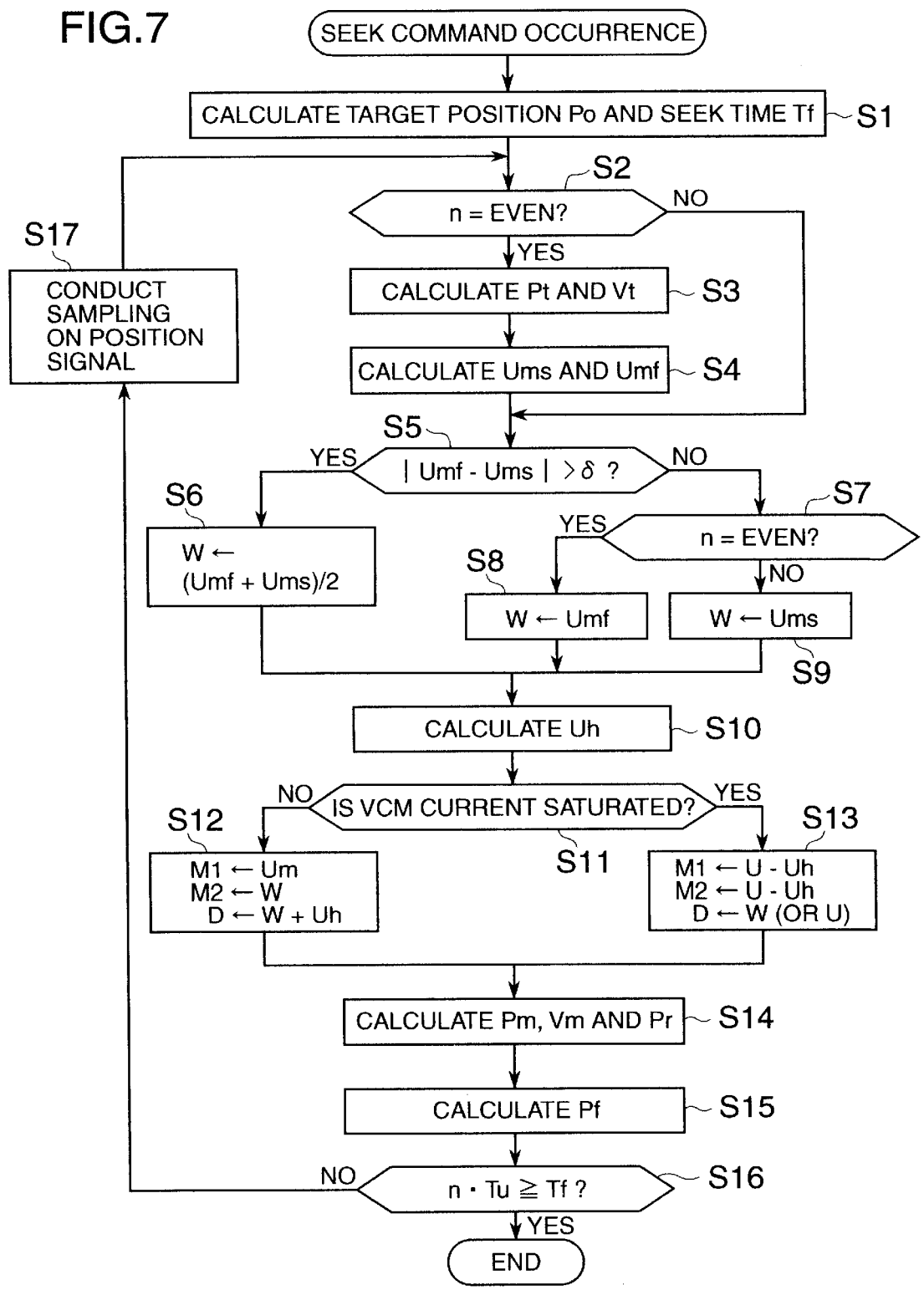
FIG. 7 is a flow chart example showing an operation of the whole positioning control apparatus shown in FIG. 1.

In FIG. 9, computations of steps S21, S22, S23 and S24 are the same as those of the steps S1, S3, S4 and S10, respectively. At these steps, there are calculated every sampling instant (every Ts) the position trajectory Pt, the velocity trajectory Vt, values Umf and Ums of the model feedback control signal Um represented by the expressions (7) and (8), and the feedback control signal Uh. Subsequently, the saturation detection section 48 effects a decision of saturation (step S25). If the current is not saturated, then a timer is started. The timer may be a software timer, and the timer times up when a half of the sampling period Ts of the position signal P, i.e., Tu (step S26). A control parameter s is set equal to 0 (step S27), and the control signal Um is set equal to Umf (step S28). It is determined whether |Umf−Ums|>δ (step S29). If |Umf−Ums| is greater than the predetermined value δ, then W is set equal to (Umf+Ums)/2 in order to prevent vibration (step S30). If |Umf−Ums| is less than δ, then W is set equal to Um (step S31). The model input M1 is set equal to Um (=Umf), the model input M2 is set equal to W, and the VCM control signal D is set equal to W+Uh (step S32). Subsequently, it is determined whether s=1 (step S33). If the relation s=1 is not satisfied, then the timer timing up is waited for (step S34). If the timer has timed up, then Um is set equal to Ums and s is set equal to 1 (steps S35 and S36) and the processing returns to the step S29. In this way, control during the former half Tu of the sampling period Ts is conducted. In the step S29 and the subsequent steps after the time up, control of the latter half Tu is conducted. At this time, Um is set equal to Ums and similar processing is conducted. Since s=1, a shift to the next processing is effected. If the VCM current is saturated, then the two model inputs M1 and M2 are set equal to U−Uh and the VCM control signal D is set equal to W (or U) (step S37). Processing of the steps S38, S39 and S40 after the VCM control signal is output is the same as the processing of the steps S14, S15 and S16. Effects similar to those of FIG. 7 are also obtained by the processing of FIG. 9 heretofore described.

Figure 10:
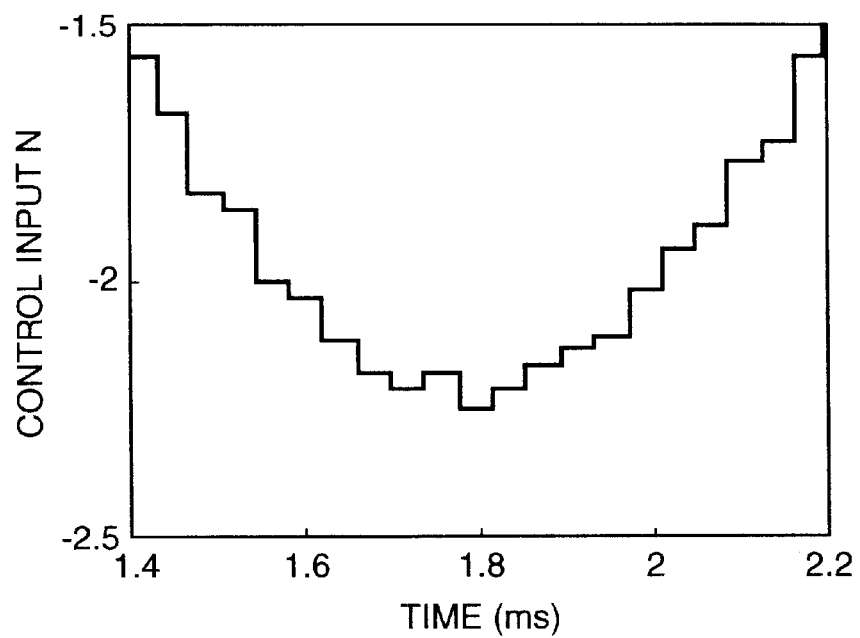
FIG. 10 is a diagram showing an example of a time response of an acceleration obtained by using the present invention.
Figure 11:
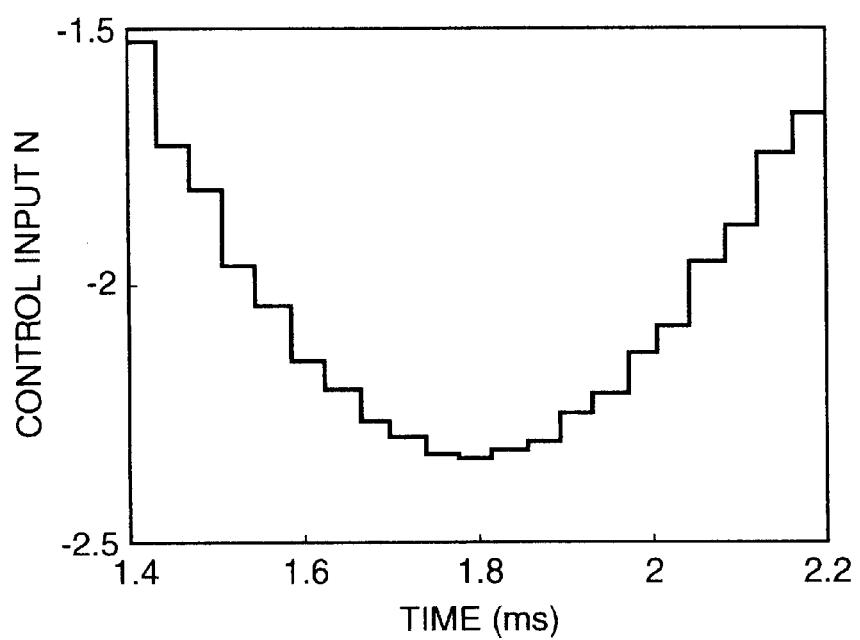
FIG. 11 is a diagram showing an example of a time response of an acceleration obtained by using a known method.

FIG. 10 shows an example of a control input near the time of a maximum deceleration in the present invention. In the case where the present invention is used, it becomes possible to modify a quantization error caused by the control program, by using the scheme in which the model output is fed back. In some cases, therefore, minute unevenness occurs in the current waveform near the time of the maximum deceleration. In other words, the sign of the acceleration at the time of the maximum deceleration is inverted at three or more consecutive samples. The magnitude of the unevenness also changes depending upon the initial value and the moving distance. FIG. 11 shows the control input of a known PTC of feed-forward type in the vicinity of the time of the maximum deceleration in the case where a similar position trajectory and a similar velocity trajectory are given. In the control input of the conventional technique, minute unevenness is not recognized and the sign of the acceleration at the time of the maximum deceleration is not inverted at three or more consecutive samples.

It is also possible to apply the present invention to a part of the seek operation. For example, in a method, calculation is conducted according to the seek scheme in a section ranging from the seek start to the end of the voltage saturation, and the present invention is applied at a time point when the voltage has come into the non-saturation state. In that case, the internal model computation used in the present invention is necessary even while the known seek scheme is being executed. It is also possible to apply the seek scheme according to the present invention and then effect switching to the known settling mode at a time point when the seek end is approached.

The present invention brings about an effect that, even in the case where the VCM current is saturated in the positioning control system of the magnetic disk apparatus, the magnetic head can be positioned on a target track with high speed and high precision.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A positioning control apparatus for moving a head that conducts recording and/or reproducing on a magnetic recording medium to a target position, said positioning control apparatus comprising:

a trajectory generation unit for calculating a seek time required to move the head to a given target position, and a position trajectory and a velocity trajectory within the seek time every 2Ts, Ts being a sampling period of a position signal detected by a head position detection unit;

a rigid body model and a dead time model of a head system ranging from outputting of a head drive signal to outputting of a detected position signal, inclusive of a head drive unit;

a model control unit for calculating first and second model feedback control signals every 2Ts so as to cause a rigid body model position and a rigid body model velocity calculated by using said rigid body model to coincide respectively with the position trajectory and the velocity trajectory at a next sampling time point of the position signal, Ts being the sampling period of the position signal;

a position control unit for calculating a feedback control signal based on a deviation between a model position for position feedback calculated by using said rigid body model and said dead time model and the detected position signal;

a saturation detection unit for effecting detection to determine whether a drive current flowing through the head drive unit is saturated; and a switching unit for setting an input control signal equal to the first model feedback control signal at an even-numbered sampling time point of the position signal, setting the input control signal equal to the second model feedback control signal at an odd-numbered sampling time point of the position signal, responding to the drive current being judged by said saturation detection unit to be not saturated by setting a model input of said rigid body model equal to the input control signal and outputting a sum of the feedback control signal calculated by said position control unit and the input control signal to the head system as the head drive signal, and responding to the drive current being judged to be saturated by setting the model input of said rigid body model equal to a signal obtained by subtracting the feedback control signal calculated by said position control unit from a head acceleration corresponding to the drive current and outputting the input control signal or the head acceleration to the head system as the head drive signal.

2. The positioning control apparatus according to claim 1, wherein a resonance model of the head system is added to the positioning control apparatus, the model position for position feedback is calculated by using said resonance model, said rigid body model, and said dead time model, when said saturation detection unit has judged the drive current to be not saturated, said switching unit sets a model input of said resonance model equal to the input control signal, and when said saturation detection unit has judged the drive current to be saturated, said switching unit sets the model input of said resonance model equal to a signal obtained by subtracting the feedback control signal calculated by said position control unit from the head acceleration corresponding to the drive current.

3. The positioning control apparatus according to claim 2, wherein said model control unit calculates the first model feedback control signal Umf and the second model feedback control signal Ums respectively according to the following equations $$Umf=(1/Tu^2)(Pt-Pm)-(\tfrac{1}{2}Tu)(Vt+3\ Vm)$$

$$Ums=(1/Tu^2)(-Pt+Pm)+(\tfrac{1}{2}Tu)(3\ Vt+Vm)$$

where time Tu is a value equal to the sampling period Ts of the position signal, Pt and Vt are respectively the position trajectory and the velocity trajectory, and Pm and Vm are respectively the rigid body model position and the rigid body model velocity calculated by using said rigid body model.

4. The positioning control apparatus according to claim 1, wherein said model control unit calculates the first model feedback control signal Umf and the second model feedback control signal Ums respectively according to the following equations $$Umf=(1/Tu^2)(Pt-Pm)-(\tfrac{1}{2}Tu)(Vt+3\ Vm)$$

$$Ums=(1/Tu^2)(-Pt+Pm)+(\tfrac{1}{2}Tu)(3\ Vt+Vm)$$

where time Tu is a value equal to the sampling period Ts of the position signal, Pt and Vt are respectively the position trajectory and the velocity trajectory, and Pm and Vm are respectively the rigid body model position and the rigid body model velocity calculated by using said rigid body model.

5. A positioning control apparatus for moving a head that conducts recording and/or reproducing on a magnetic recording medium to a target position, said positioning control apparatus comprising:

a trajectory generation unit for calculating a seek time required to move the head to a given target position, and a position trajectory and a velocity trajectory within the seek time every Ts, Ts being a sampling period of a position signal detected by a head position detection unit;

a rigid body model and a dead time model of a head system ranging from outputting of a head drive signal to outputting of a detected position signal, inclusive of a head drive unit;

a model control unit for calculating first and second model feedback control signals every Ts so as to cause a rigid body model position and a rigid body model velocity calculated by using said rigid body model to coincide respectively with the position trajectory and the velocity trajectory at a next sampling time point of the position signal;

a position control unit for calculating a feedback control signal based on a deviation between a model position for position feedback calculated by using said rigid body model and said dead time model and the detected position signal;

a saturation detection unit for effecting detection to determine whether a drive current flowing through the head drive unit is saturated; and a switching unit for setting an input control signal equal to the first model feedback control signal during a former half having (½)Ts of the sampling period Ts beginning with a sampling time point of the head signal, setting the input control signal equal to the second model feedback control signal during a latter half having (½)Ts of the sampling period Ts, responding to the drive current being judged by said saturation detection unit to be not saturated by setting a model input of said rigid body model equal to the input control signal and outputting a sum of the feedback control signal calculated by said position control unit and the input control signal to the head system as the head drive signal, and responding to the drive current being judged to be saturated by setting the model input of said rigid body model equal to a signal obtained by subtracting the feedback control signal calculated by said position control unit from a head acceleration corresponding to the drive current and outputting the input control signal or the head acceleration to the head system as the head drive signal.

6. The positioning control apparatus according to claim 2, wherein said model control unit calculates the first model feedback control signal Umf and the second model feedback control signal Ums respectively according to the following equations $$Umf=(1/Tu^2)(Pt-Pm)-(\tfrac{1}{2}Tu)(Vt+3\ Vm)$$

$$Ums=(1/Tu^2)(-Pt+Pm)+(\tfrac{1}{2}Tu)(3\ Vt+Vm)$$

where time Tu is a value equal to half of the sampling period Ts of the position signal, Pt and Vt are respectively the position trajectory and the velocity trajectory, and Pm and Vm are respectively the rigid body model position and the rigid body model velocity.

7. The positioning control apparatus according to claim 5, wherein a resonance model of the head system is added to the positioning control apparatus, the model position for position feedback is calculated by using said resonance model, said rigid body model, and said dead time model, when said saturation detection unit has judged the drive current to be not saturated, said switching unit sets a model input of said resonance model equal to the input control signal, and when said saturation detection unit has judged the drive current to be saturated, said switching unit sets the model input of said resonance model equal to a signal obtained by subtracting the feedback control signal calculated by said position control unit from the head acceleration corresponding to the drive current.

8. The positioning control apparatus according to claim 7, wherein said model control unit calculates the first model feedback control signal Umf and the second model feedback control signal Ums respectively according to the following equations $$Umf=(1/Tu^2)(Pt-Pm)-(\tfrac{1}{2}Tu)(Vt+3\ Vm)$$

$$Ums=(1/Tu^2)(-Pt+Pm)+(\tfrac{1}{2}Tu)(3\ Vt+Vm)$$

where time Tu is a value equal to the sampling period Ts of the position signal, Pt and Vt are respectively the position trajectory and the velocity trajectory, and Pm and Vm are respectively the rigid body model position and the rigid body model velocity calculated by using said rigid body model.

9. A positioning control apparatus for moving a head that conducts recording and/or reproducing on a magnetic recording medium to a target position, said positioning control apparatus comprising:

a trajectory generation unit for calculating a seek time required to move the head to a given target position, and a position trajectory and a velocity trajectory within the seek time every 2Ts, Ts being a sampling period of a position signal detected by a head position detection unit;

a rigid body model and a dead time model of a head system ranging from outputting of a head drive signal to outputting of a detected position signal, inclusive of a head drive unit;

a model control unit for calculating first and second model feedback control signals every 2Ts so as to cause a rigid body model position and a rigid body model velocity calculated by using said rigid body model to coincide respectively with the position trajectory and the velocity trajectory at a next sampling time point of the position signal, Ts being the sampling period of the position signal;

a position control unit for calculating a feedback control signal based on a deviation between a model position for position feedback calculated by using said rigid body model and said dead time model and the detected position signal;

a saturation detection unit for effecting detection to determine whether a drive current flowing through the head drive unit is saturated; and a switching unit for setting an input control signal equal to the first model feedback control signal at an even-numbered sampling time point of the position signal, setting the input control signal equal to the second model feedback control signal at an odd-numbered sampling time point of the position signal, responding to an absolute value of a difference between the first and second model feedback control signals exceeding a predetermined threshold by setting a vibration compensation input equal to an average of the two model feedback control signals, responding to the absolute value not exceeding the predetermined threshold by setting the vibration compensation input equal to the input control signal, responding to the drive current being judged by said saturation detection unit to be not saturated by setting a model input of said rigid body model equal to the input control signal and outputting a sum of the feedback control signal calculated by said position control unit and the vibration compensation input to the head system as the head drive signal, and responding to the drive current being judged to be saturated by setting the model input of said rigid body model equal to a signal obtained by subtracting the feedback control signal calculated by said position control unit from a head acceleration corresponding to the drive current and outputting the vibration compensation input or the head acceleration to the head system as the head drive signal.

10. The positioning control apparatus according to claim 9, wherein a resonance model of the head system is added to the positioning control apparatus, the model position for position feedback is calculated by using said resonance model, said rigid body model, and said dead time model, when said saturation detection unit has judged the drive current to be not saturated, said switching unit sets a model input of said resonance model equal to the vibration compensation input, and when said saturation detection unit has judged the drive current to be saturated, said switching unit sets the model input of said resonance model equal to a signal obtained by subtracting the feedback control signal calculated by said position control means from the head acceleration corresponding to the drive current.

11. The positioning control apparatus according to claim 10, wherein said model control unit calculates the first model feedback control signal Umf and the second model feedback control signal Ums respectively according to the following equations $$Umf=(1/Tu^2)(Pt-Pm)-(\tfrac{1}{2}Tu)(Vt+3\ Vm)$$

$$Ums=(1/Tu^2)(-Pt+Pm)+(\tfrac{1}{2}Tu)(3\ Vt+Vm)$$

where time Tu is a value equal to half of the sampling period Ts of the position signal, Pt and Vt are respectively the position trajectory and the velocity trajectory, and Pm and Vm are respectively the rigid body model position and the rigid body model velocity.

12. The positioning control apparatus according to claim 9, wherein said model control unit calculates the first model feedback control signal Umf and the second model feedback control signal Ums respectively according to the following equations $$Umf=(1/Tu^2)(Pt-Pm)-(\tfrac{1}{2}Tu)(Vt+3\ Vm)$$

$$Ums=(1/Tu^2)(-Pt+Pm)+(\tfrac{1}{2}Tu)(3\ Vt+Vm)$$

where time Tu is a value equal to the sampling period Ts of the position signal, Pt and Vt are respectively the position trajectory and the velocity trajectory, and Pm and Vm are respectively the rigid body model position and the rigid body model velocity calculated by using said rigid body model.

13. A positioning control apparatus for moving a head that conducts recording and/or reproducing on a magnetic recording medium to a target position, said positioning control apparatus comprising:

a trajectory generation unit for calculating a seek time required to move the head to a given target position, and a position trajectory and a velocity trajectory within the seek time every Ts, Ts being a sampling period of a position signal detected by a head position detection unit;

a rigid body model and a dead time model of a head system ranging from outputting of a head drive signal to outputting of a detected position signal, inclusive of a head drive unit;

a model control unit for calculating first and second model feedback control signals every Ts so as to cause a rigid body model position and a rigid body model velocity calculated by using said rigid body model to coincide respectively with the position trajectory and the velocity trajectory at a next sampling time point of the position signal;

a position control unit for calculating a feedback control signal based on a deviation between a model position for position feedback calculated by using said rigid body model and said dead time model and the detected position signal;

a saturation detection unit for effecting detection to determine whether a drive current flowing through the head drive unit is saturated; and a switching unit for setting an input control signal equal to the first model feedback control signal during a former half having (½)Ts of the sampling period Ts beginning with a sampling time point of the head signal, setting the input control signal equal to the second model feedback control signal during a latter half having (½)Ts of the sampling period Ts, responding to an absolute value of a difference between the first and second model feedback control signals exceeding a predetermined threshold by setting a vibration compensation input equal to an average of the two model feedback control signals, responding to the absolute value not exceeding the predetermined threshold by setting the vibration compensation input equal to the input control signal, responding to the drive current being judged by said saturation detection unit to be not saturated by setting a model input of said rigid body model equal to the input control signal and outputting a sum of the feedback control signal calculated by said position control unit and the vibration compensation input to the head system as the head drive signal, and responding to the drive current being judged to be saturated by setting the model input of said rigid body model equal to a signal obtained by subtracting the feedback control signal calculated by said position control unit from a head acceleration corresponding to the drive current and outputting the vibration compensation input or the head acceleration to the head system as the head drive signal.

14. The positioning control apparatus according to claim 13, wherein a resonance model of the head system is added to the positioning control apparatus, the model position for position feedback is calculated by using said resonance model, said rigid body model, and said dead time model, when said saturation detection unit has judged the drive current to be not saturated, said switching unit sets a model input of said resonance model equal to the vibration compensation input, and when said saturation detection unit has judged the drive current to be saturated, said switching unit sets the model input of said resonance model equal to a signal obtained by subtracting the feedback control signal calculated by said position control means from the head acceleration corresponding to the drive current.

15. The positioning control apparatus according to claim 14, wherein said model control unit calculates the first model feedback control signal Umf and the second model feedback control signal Ums respectively according to the following equations $$Umf=(1/Tu^2)(Pt-Pm)-(\tfrac{1}{2}Tu)(Vt+3\ Vm)$$

$$Ums=(1/Tu^2)(-Pt+Pm)+(\tfrac{1}{2}Tu)(3\ Vt+Vm)$$

where time Tu is a value equal to half of the sampling period Ts of the position signal, Pt and Vt are respectively the position trajectory and the velocity trajectory, and Pm and Vm are respectively the rigid body model position and the rigid body model velocity.

16. The positioning control apparatus according to claim 13, wherein said model control unit calculates the first model feedback control signal Umf and the second model feedback control signal Ums respectively according to the following equations $$Umf=(1/Tu^2)(Pt-Pm)-(\tfrac{1}{2}Tu)(Vt+3\ Vm)$$

$$Ums=(1/Tu^2)(-Pt+Pm)+(\tfrac{1}{2}Tu)(3\ Vt+Vm)$$

where time Tu is a value equal to half of the sampling period Ts of the position signal, Pt and Vt are respectively the position trajectory and the velocity trajectory, and Pm and Vm are respectively the rigid body model position and the rigid body model velocity.

* * * * *